US008514536B2

(12) United States Patent
Sawada et al.

(10) Patent No.: US 8,514,536 B2
(45) Date of Patent: Aug. 20, 2013

(54) ESD PROTECTION DEVICE AND MANUFACTURING METHOD THEREFOR

(75) Inventors: Eriko Sawada, Nagaokakyo (JP); Takahiro Sumi, Nagaokakyo (JP); Jun Adachi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/412,652

(22) Filed: Mar. 6, 2012

(65) Prior Publication Data

US 2012/0162838 A1 Jun. 28, 2012

Related U.S. Application Data

(63) Continuation of application No. PCT/JP2010/066903, filed on Sep. 29, 2010.

(30) Foreign Application Priority Data

Sep. 30, 2009 (JP) ................................ 2009-227193

(51) Int. Cl.
*H02H 9/00* (2006.01)

(52) U.S. Cl.
USPC ........................................................ 361/56

(58) Field of Classification Search
USPC ........................................................ 361/56
See application file for complete search history.

(56) References Cited

U.S. PATENT DOCUMENTS

| | | | | |
|---|---|---|---|---|
| 7,660,095 | B2 * | 2/2010 | Shato et al. | 361/120 |
| 8,238,069 | B2 * | 8/2012 | Adachi et al. | 361/56 |
| 2009/0067113 | A1 | 3/2009 | Urakawa | |
| 2010/0309595 | A1 | 12/2010 | Adachi et al. | |

FOREIGN PATENT DOCUMENTS

| | | | |
|---|---|---|---|
| JP | 09-266053 | A | 10/1997 |
| JP | 2001-043954 | A | 2/2001 |
| JP | 2001-345161 | A | 12/2001 |
| JP | 2005-276666 | A | 10/2005 |
| WO | 2008/146514 | A1 | 12/2008 |
| WO | 2009/001649 | A1 | 12/2008 |
| WO | 2009/098944 | A1 | 8/2009 |

OTHER PUBLICATIONS

Official Communication issued in International Patent Application No. PCT/JP2010/066903, mailed on Dec. 28, 2010.

* cited by examiner

*Primary Examiner* — Stephen W Jackson
(74) *Attorney, Agent, or Firm* — Keating & Bennett, LLP

(57) ABSTRACT

An ESD protection device includes a ceramic base material including a glass component; opposed electrodes including an opposed electrode on one side and an opposed electrode on the other side, which are arranged to have portions opposed to each other at a predetermined distance in the ceramic base material; and a discharge auxiliary electrode between the opposed electrodes, which is connected to each of the opposed electrode on the one side and the opposed electrode on the other side, and arranged to provide a bridge from the opposed electrode on the one side to the opposed electrode on the other side. A sealing layer to prevent ingress of the glass component from the ceramic base material into the discharge auxiliary electrode is provided between the discharge auxiliary electrode and the ceramic base material.

8 Claims, 5 Drawing Sheets

RELATIONSHIP BETWEEN ΔB AND THICKNESS OF REACTIVE LAYER

ESD PROTECTION DEVICE AND MANUFACTURING METHOD THEREFOR

BACKGROUND OF THE INVENTION

1. Field of the Invention

The present invention relates to an electrostatic discharge (ESD) protection device to protect a semiconductor device, etc. from electrostatic discharge failures, and a method for manufacturing such an ESD protection device.

2. Description of the Related Art

In recent years, for the use of commercial-off-the-shelf appliances, there has been a tendency to increase the frequency of inserting and removing cables as input-output interfaces, and consequently, static electricity is likely to be applied to input-output connector areas. In addition, miniaturization in design and increases in signal frequency have made it difficult to create paths, and LSI itself has been highly sensitive to static electricity.

Therefore, ESD protection devices have been used widely for protecting semiconductor devices such as LSI from electrostatic discharge (ESD).

As this type of ESD protection device, an ESD protection device (chip-type surge absorber) including an insulating chip body which has an enclosed space with an inert gas encapsulated in the center, opposed electrodes each having a microgap in the same plane, and external electrodes, and a method for manufacturing the ESD protection device have been proposed (see Japanese Patent Application Laid-Open No. 9-266053).

However, in the ESD protection device (chip-type surge absorber) in Japanese Patent Application Laid-Open No. 9-266053, electrons need to jump directly across the microgaps of the opposed electrodes without any assistance, and the discharge capacity of the ESD protection device thus depends on the microgap width. Furthermore, the more the microgaps are narrowed, the more the capacity as a surge absorber is increased. However, the width of a gap has a limitation in the formation of opposed electrodes with the use of a printing method as described in Japanese Patent Application Laid-Open No. 9-266053, and an excessively narrow gap results in problems such as the opposed electrodes being connected to each other to cause a short circuit defect.

In addition, as described in Japanese Patent Application Laid-Open No. 9-266053, a cavity section is formed by stacking perforated sheets. Thus, considering that there is a need to provide a microgap in the cavity section, the reduction in size of the product also has a limitation in terms of stacking accuracy. Furthermore, in order to provide the enclosed space filled with an encapsulating gas, there is a need to carry out stacking and pressure bonding under the encapsulating gas upon stacking, thus leading to the problems of a complicated manufacturing process, a decrease in productivity, and an increase cost.

Furthermore, as another ESD protection device, an ESD protection device (surge absorbing element) provided with internal electrodes electrically connected to a pair of external electrodes and a discharge space within an insulating ceramic layer including the external electrodes, and with a discharge gas trapped in the discharge space, and a method for manufacturing the ESD protection device have been proposed (see Japanese Patent Application Laid-Open No. 2001-43954).

However, the ESD protection device in Japanese Patent Application Laid-Open No. 2001-43954 also have the same problems as the ESD protection device in Japanese Patent Application Laid-Open No. 9-266053 mentioned above.

SUMMARY OF THE INVENTION

In view of the circumstances described above, preferred embodiments of the present invention provide an ESD protection device which is excellent in discharge capacity, causes fewer short circuit defects, requires no special step for manufacturing thereof, and is excellent in productivity, and a method for manufacturing such an ESD protection device.

An ESD protection device according to a preferred embodiment of the present invention includes a ceramic base material including a glass component; opposed electrodes including an opposed electrode on one side and an opposed electrode on the other side, the opposed electrodes being arranged to have portions opposed to each other with a distance therebetween in the ceramic base material; and a discharge auxiliary electrode connected to each of the opposed electrode on the one side and the opposed electrode on the other side constituting the opposed electrodes, the discharge auxiliary electrode being arranged to provide a bridge from the opposed electrode on the one side to the opposed electrode on the other side, wherein a sealing layer to prevent ingress of the glass component from the ceramic base material into the discharge auxiliary electrode is provided between the discharge auxiliary electrode and the ceramic base material.

In the ESD protection device according to a preferred embodiment of the present invention, a reactive layer including a reaction product formed by a reaction between a constituent material of the sealing layer and a constituent material of the ceramic base material is preferably provided at the interface between the sealing layer and the ceramic base material.

In the ESD protection device according to a preferred embodiment of the present invention, a difference $\Delta B(=B\mathbf{1}-B\mathbf{2})$ is preferably about 1.4 or less between basicity B1 of a main constituent material of the sealing layer and basicity B2 of an amorphous portion of the ceramic base material.

In addition, the sealing layer preferably contains some of elements constituting the ceramic base material.

The sealing layer preferably contains an aluminum oxide as its main constituent.

In addition, preferably, a cavity section is provided in the ceramic base material, to cause the cavity section to face a discharge gap section where the opposed electrode on the one side and the opposed electrode on the other side, which constitute the opposed electrodes, have portions facing each other, and a region of the discharge auxiliary electrode located on the discharge gap section.

The discharge auxiliary electrode preferably includes a metallic particle and a ceramic component.

Furthermore, a method for manufacturing an ESD protection device according to another preferred embodiment of the present invention preferably includes the steps of printing a sealing layer paste on one principal surface of a first ceramic green sheet, thereby forming an unfired sealing layer; printing a discharge auxiliary electrode paste to coat at least a portion of the sealing layer, thereby forming an unfired discharge auxiliary electrode; printing an opposed electrode paste on one principal surface of the first ceramic green sheet, thereby forming unfired opposed electrodes having an opposed electrode on one side and an opposed electrode on the other side, the opposed electrodes each partially covering the discharge auxiliary electrode, and the opposed electrodes being formed with a distance therebetween; printing a sealing layer paste so as to cover a discharge gap section where the opposed electrode on the one side and the opposed electrode on the other side have portions facing each other, and a region of the discharge auxiliary electrode located on the discharge gap section, thereby forming an unfired sealing layer; stacking a second ceramic green sheet on one principal surface of the first ceramic green sheet, thereby forming an unfired laminated body; and firing the laminated body.

The ESD protection device according to a preferred embodiment of the present invention preferably includes, in the ceramic base material, the opposed electrodes provided with the opposed electrode on the one side and the opposed electrode on the other side, which have portions opposed to each other with a distance therebetween; and the discharge auxiliary electrode connected to each of the opposed electrode on the one side and the opposed electrode on the other side, which is arranged so as to provide a bridge from the opposed electrode on the one side to the opposed electrode on the other side, wherein the sealing layer to prevent ingress of the glass component from the ceramic base material into the discharge auxiliary electrode is provided between the discharge auxiliary electrode and the ceramic base material. Thus, the ingress of the glass component from the ceramic base material containing the glass component can be suppressed and prevented to prevent short circuit defects caused by sintering of the discharge auxiliary electrode section.

Further, the sealing layer also interposed between the ceramic base material and the connections between the opposed electrodes and the discharge auxiliary electrode achieves suppression and prevention of the ingress of the glass component through the opposed electrodes into the discharge auxiliary electrode, and thus making it possible to render the present preferred embodiment of the present invention more effective.

In addition, in the case of adopting a structure which includes the reactive layer including a reaction product formed by the reaction between the constituent material of the sealing layer and the constituent material of the ceramic base material at the interface between the sealing layer and the ceramic base material, a high-reliability product with the sealing layer attached firmly to the ceramic material constituting the ceramic base material can be provided even when firing for the product is carried out at a temperature lower than the melting point of the main constituent of the formed sealing layer.

Furthermore, the case of an ESD protection device configured so that the difference $\Delta B(=B\mathbf{1}-B\mathbf{2})$ is about 1.4 or less between the basicity B1 of the main constituent material of the sealing layer and the basicity B2 of the amorphous portion of the ceramic base material, more specifically, the difference in basicity specified as described above makes it possible to suppress and prevent an excessive reaction or a poor reaction between the sealing layer and the ceramic base material to provide a high-reliability ESD protection device including a reactive layer which fails to interfere with the function as an ESD protection device.

In addition, the case of the sealing layer containing some of elements included in the ceramic base material allows for the suppression and prevention of an excessive reaction between the sealing section and the ceramic base material, thereby making it possible to provide an ESD protection device which has favorable characteristics.

When the sealing layer contains an aluminum oxide as its main constituent, the junction between the sealing section and the ceramic base material makes it possible to achieve a junction without an excessive/poor reaction between the two, and allows the ingress of glass from the ceramic base material to be blocked reliably in the sealing layer, thus making it possible to suppress and prevent short circuit defects caused by the ingress of the glass component into the discharge auxiliary electrode and thus sintering of the discharge auxiliary electrode.

In addition, when a cavity section is provided in the ceramic base material, and configured to cause the cavity section to face a discharge gap section where the opposed electrode on the one side and the opposed electrode on the other side, which constitute the opposed electrodes, have portions facing each other, and a region of the discharge auxiliary electrode located on the discharge gap section, a discharge phenomenon is also produced in the cavity section during ESD application, thus allowing the discharge capacity to be improved more than in the absence of the cavity section, and further allowing an ESD protection device to be provided with favorable characteristics.

When the discharge auxiliary electrode includes metallic particles and a ceramic component, the ceramic component interposed between the metallic particles causes the metallic particles to be located at a distance by the presence of the ceramic component, thus reducing sintering of the discharge auxiliary electrode in the step of forming the discharge auxiliary electrode by firing the discharge auxiliary electrode paste, and making it possible to suppress and prevent short circuit defects caused by excessive sintering of the discharge auxiliary electrode. In addition, the ceramic component contained can suppress and prevent an excessive reaction with the sealing layer.

Furthermore, the method for manufacturing an ESD protection device according to a preferred embodiment of the present invention preferably includes the steps of printing a sealing layer paste on a first ceramic green sheet, thereby forming an unfired sealing layer; printing a discharge auxiliary electrode paste to coat at least a portion of the sealing layer, thereby forming an unfired discharge auxiliary electrode; printing an opposed electrode paste, thereby forming unfired opposed electrodes having an opposed electrode on one side and an opposed electrode on the other side, the opposed electrodes each partially covering the discharge auxiliary electrode, and the opposed electrodes being formed with a distance therebetween; printing a sealing layer paste so as to cover a discharge gap section where the opposed electrode on the one side and the opposed electrode on the other side, which constitute the opposed electrodes, have portions facing each other, and a region of the discharge auxiliary electrode located on the discharge gap section, thereby forming an unfired sealing layer; stacking a second ceramic green sheet on one principal surface of the first ceramic green sheet, thereby forming an unfired laminated body; and firing the laminated body, and the respective steps are general-purpose steps used widely in the manufacturing processes of normal ceramic electronic components. Thus, the method is excellent in mass productivity. In addition, the sealing layer formed so as to surround the discharge gap section and the discharge auxiliary electrode section located thereon isolates the discharge gap section and the discharge auxiliary electrode from the ceramic constituting the ceramic base material, thus making it possible to prevent short circuit defects reliably from being caused by excessive sintering of the discharge auxiliary electrode due to the inflow of the glass component, to thereby ensure a stable discharge capacity.

Further, in the method for manufacturing an ESD protection device according to a preferred embodiment of the present invention, it is also possible to achieve an ESD protection device including external electrodes through single firing in such a way that an external electrode paste is printed on the surface of the unfired laminated body so as to be connected to the opposed electrodes, and then subjected to firing before the step of firing the laminated body, and it is also possible to form external electrodes in such a way that an external electrode paste is printed on the surface of the laminated body, and then subjected to firing after firing the laminated body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

With reference to preferred embodiments of the present invention, features of the present invention will be described below in more detail.

Figure 1:
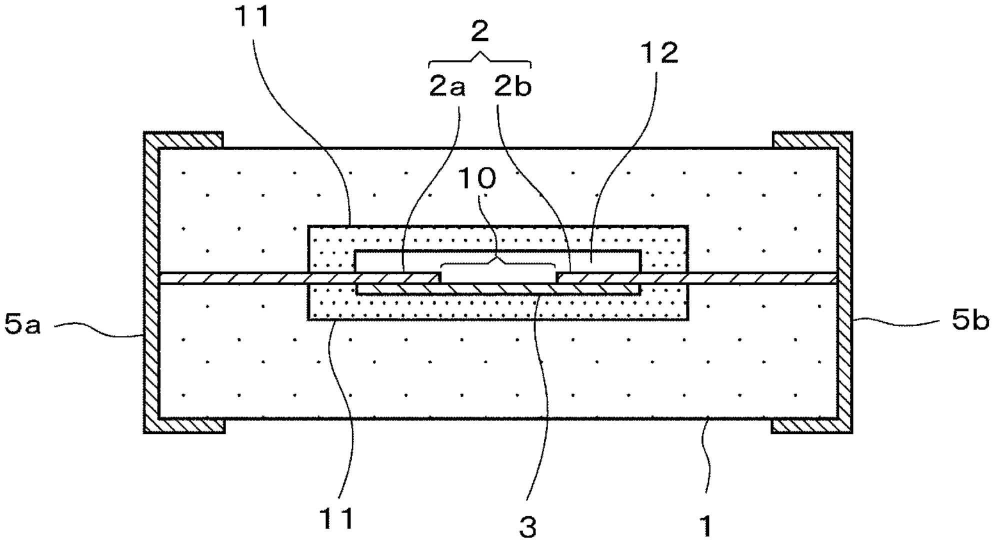
FIG. 1 is a front cross-sectional view schematically illustrating the structure of an ESD protection device including a cavity section, according to a preferred embodiment of the present invention.
Figure 2:
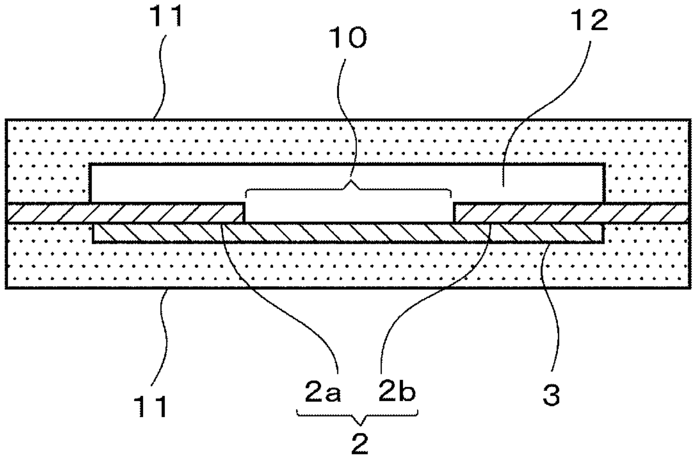
FIG. 2 is an enlarged front cross-sectional view illustrating an enlarged main section of the ESD protection device including the cavity section, according to a preferred embodiment of the present invention.
Figure 3:
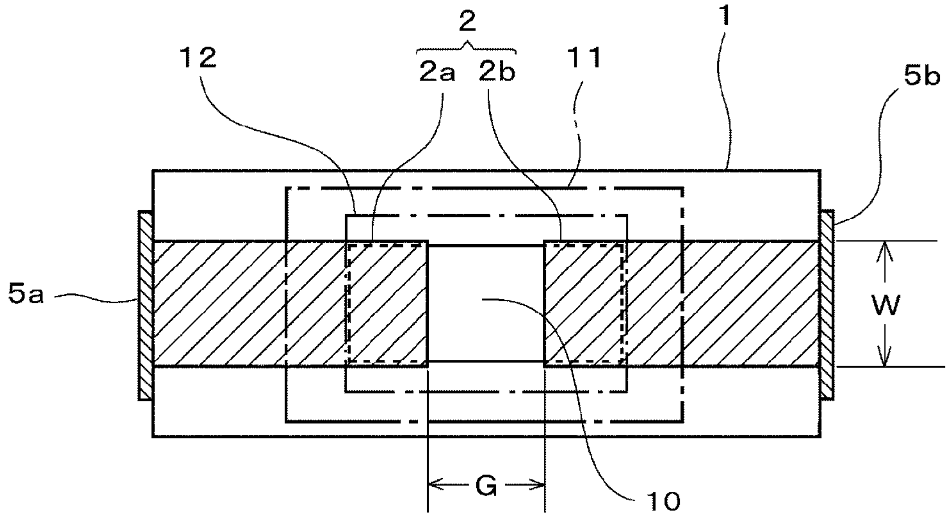
FIG. 3 is a plan view illustrating the internal structure of the ESD protection device including the cavity section, according to a preferred embodiment of the present invention.

FIG. 1 is a cross-sectional view schematically illustrating the structure of an ESD protection device according to a preferred embodiment of the present invention, FIG. 2 is an enlarged front cross-sectional view illustrating an enlarged main section of the ESD protection device, and FIG. 3 is a plan view illustrating the internal structure of the ESD protection device according to a preferred embodiment of the present invention.

This ESD protection device preferably includes, as shown in FIGS. 1 to 3, a ceramic base material 1 containing a glass component, opposed electrodes (extraction electrodes) 2 including an opposed electrode **2*a* on one side and an opposed electrode 2*b* on the other side, which are located in the same plane in the ceramic base material 1, and have ends opposed to each other, a discharge auxiliary electrode 3 in partial contact with the opposed electrode 2*a* on one side and the opposed electrode 2*b* on the other side, which is arranged so as to provide a bridge from the opposed electrode 2*a* on one side to the opposed electrode 2*b* on the other side, and external electrodes 5*a* and 5*b* for external electrical connections, which are located on both ends of the ceramic base material 1 to provide conduction to the opposed electrode 2*a* on one side and the opposed electrode 2*b* on the other side to define the opposed electrodes 2**.

The discharge auxiliary electrode 3 includes metallic particles and a ceramic component, which is configured to reduce excessive sintering of the discharge auxiliary electrode 3, thereby making it possible to prevent short circuit detects caused by excessive sintering.

It is possible to use, as the metallic particles, copper particles, and preferably, a copper powder with a surface coated with an inorganic oxide or a ceramic component. In addition, while the ceramic component is not particularly limited, more preferable ceramic components include, as an example, a ceramic component containing the constitution material of the ceramic base material (in this case, a Ba—Si—Al based material), or a ceramic component containing a semiconductor component such as SiC.

In addition, a discharge gap section 10 where the opposed electrode **2*a* on one side and the opposed electrode 2*b* on the other side to define the opposed electrodes 2 are opposed to each other, and a region of the discharge auxiliary electrode 3 located on the discharge gap section 10 are arranged to face a cavity section 12 provided in the ceramic base material 1. More specifically, in this ESD protection device, the functional section to serve as an ESD protection device, such as the discharge gap section 10 and the discharge auxiliary electrode 3 to connect the opposed electrode 2*a* on one side and the opposed electrode 2*b* on the other side, is arranged to face the cavity section 12 in the ceramic base material 1**.

Furthermore, in this ESD protection device, a sealing layer 11 preferably is arranged to cover the opposed section (discharge gap section 10) between the opposed electrode **2*a* on one side and the opposed electrode 2*b* on the other side, connections between the opposed electrodes 2 and the discharge auxiliary electrode 3, and the region of the discharge auxiliary electrode 3 located on the discharge gap section 10, as well as cavity section 12, etc., and lie between the ceramic base material 1 and the discharge auxiliary electrode 3. This sealing layer 11 is a porous layer including, for example, ceramic particles such as alumina, which functions to absorb and keep (trap) the glass component contained in the ceramic base material 1 and the glass component produced in the ceramic base material 1 in a firing step to prevent the ingress of the glass component into the cavity section 12 or the discharge gap section 10** therein.

Although there is a possibility that the penetration of the glass component into the discharge auxiliary electrode 3 will cause excessive sintering of the metallic particles, and cause a short circuit defect through fusion of the Cu powders to each other during the ESD application, the sealing layer 11 arranged to cover the discharge gap section 10, the connections between the opposed electrodes 2 and the discharge auxiliary electrode 3, and the region of the discharge auxiliary electrode 3 located on the discharge gap section 10, as well as cavity section 12, etc., and lie between the ceramic base material 1 and the discharge auxiliary electrode 3 as shown in FIG. 1 can prevent the ingress of the glass component into the discharge auxiliary electrode 3 to prevent a short circuit defect from being caused.

Figure 4:
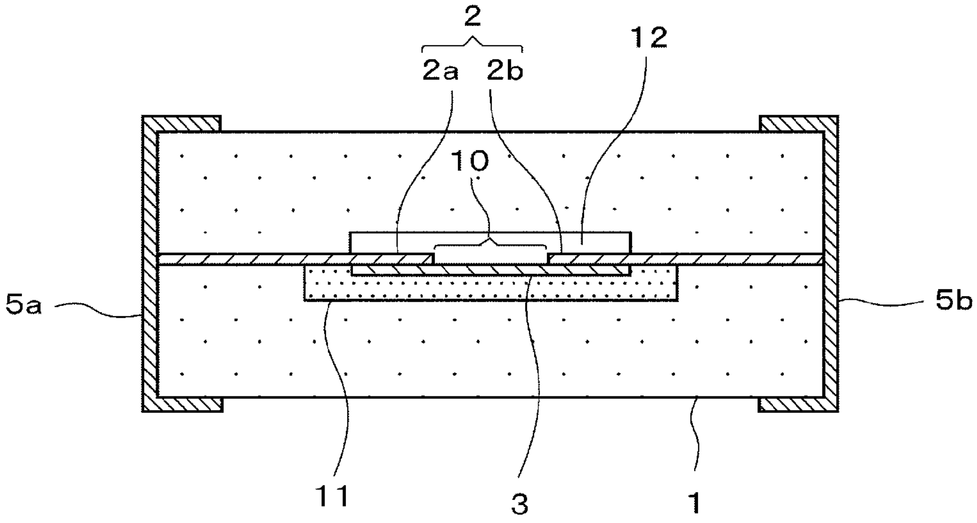
FIG. 4 is a diagram illustrating a modification example of the ESD protection device shown in FIGS. 1 to 3.

It is to be noted that it is not necessary for the sealing layer 11 to cover the entire cavity section 12 as in the case of the ESD protection device shown in FIGS. 1 to 3, and as long as the sealing layer 11 is provided so as to at least lie between the discharge auxiliary electrode 3 and the ceramic base material 1 as shown in FIG. 4, the possibility that a short circuit defect is caused can be reduced sufficiently.

A non-limiting example of a method for manufacturing an ESD protection device which has the structure as described above will now be described.

Materials containing Ba, Al, and Si as main constituents are prepared as ceramic materials for the material of the ceramic base material 1.

Then, the respective materials are blended to provide a predetermined composition, and subjected to calcination at 800° C. to 1000° C. The calcined powder obtained is subjected to grinding in a zirconia ball mill for 12 hours to obtain a ceramic powder.

This ceramic powder with an organic solvent such as toluene or ekinen added thereto is mixed, followed by the further addition and mixing of a binder and a plasticizer, thereby preparing a slurry.

This slurry is subjected to shape forming by a doctor blade method, thereby preparing a ceramic green sheet with a thickness of 50 μm.

In addition, as an opposed electrode paste for forming the pair of opposed electrodes 2*a* and 2*b*, a binder resin including an 80 weight % of a Cu powder with an average particle size of approximately 2 μm, ethyl cellulose, etc. is prepared, and agitated and mixed with the use of three rolls with the addition of a solvent to prepare an opposed electrode paste. It is to be noted that the average particle size of the Cu powder mentioned above refers to a median particle size (D50) obtained from particle size distribution measurement by Microtrack.

Furthermore, as a discharge auxiliary electrode paste for forming the discharge auxiliary electrode 3, an organic vehicle was added to (a) metallic particles (a metallic conductor powder) with a surface coated with an inorganic oxide, (b) a mixed material of the metallic particles (a) mixed with a ceramic component, (c) a mixed material of the metallic particles (a) further mixed with an inorganic oxide, or (d) a mixed material of the metallic particles (a) further mixed with a semiconductor powder, and agitated and mixed with the use of three rolls to prepare a discharge auxiliary electrode paste.

In this example, multiple types of pastes each containing an inorganic oxide and an organic vehicle were prepared as sealing layer pastes.

It is to be noted that it is desirable in a preferred embodiment of the present invention to use a sealing layer paste which has a difference ΔB (=B1−B2) of about 1.4 or less, for example, between the basicity B1 of the sealing layer paste as a main constituent material and the basicity B2 of an amorphous portion of the ceramic base material, and in this example, inorganic oxides M1 to M10 were used as the main constituent of the sealing layer paste (sealing layer main constituent) as shown in Table 1.

In addition, as the organic vehicle, an organic vehicle OV1 was used in which resins P1 and P2 shown in Table 2 and a solvent (terpineol) were blended at the ratio as shown in Table 3.

TABLE 1

| Sample Number | Sealing Layer Main Constituent | B value | ΔB value | Melting Point |
|---|---|---|---|---|
| M1 | BaO | 1.443 | 1.33 | 1923 |
| M2 | CaO | 1.000 | 0.89 | 2572 |
| M3 | $Al_2O_3$ | 0.191 | 0.08 | 2054 |
| M4 | $Nb_2O_5$ | 0.022 | −0.09 | 1520 |
| M5 | $TiO_2$ | 0.125 | 0.02 | 1855 |
| M6 | $ZrO_2$ | 0.183 | 0.07 | 2715 |
| M7 | $CeO_2$ | 0.255 | 0.15 | 340 |
| M8 | MgO | 0.638 | 0.53 | 2800 |
| M9 | ZnO | 0.721 | 0.61 | 1975 |
| M10 | SrO | 1.157 | 1.05 | 2430 |

TABLE 2

| Sample Number | Resin Type | Weight Average Molecular Weight |
|---|---|---|
| P1 | Ethocel Resin | 5 × $10^4$ |
| P2 | Alkyd Resin | 8 × $10^3$ |

TABLE 3

| | Resin | | Solvent |
|---|---|---|---|
| Sample Number | P1 | P2 | Terpineol |
| OV1 | 9 | 4.5 | 86.5 |

However, the type of the sealing layer main constituent, the method for manufacturing the sealing layer constituent, etc. have no particular limitations. For example, the particle size of M3 ($Al_2O_3$) in Table 1 was varied within the range of D50=0.2 μm to 2.5 μm to evaluate the characteristics, and it has been confirmed that the characteristics are not affected. In addition, it has been confirmed that the characteristics are also not affected in the evaluation of using varying M3 in regard to the manufacturing method. It is to be noted that the sealing layer main constituent was used on the order of D50=0.4 to 0.6 μm in this example.

The basicity of an oxide melt can be classified broadly into an average oxygen ionic activity (conceptual basicity) obtained by calculation from the composition of the system in question, or an oxygen ionic activity (action point basicity) obtained by measurement of a response to externally provided stimulation such as a chemical reaction (redox potential measurement, optical spectrum measurement, etc.).

It is desirable to use the conceptual basicity in the case of using the basicity for research on the nature or structure of, or as a compositional parameter of an oxide melt. On the other hand, various phenomena involving an oxide melt are organized by the action point basicity in a more suitable manner. The basicity in the present application refers to the former conceptual basicity.

More specifically, the $M_i$-O bonding strength of the oxide (inorganic oxide) $M_iO$ can be expressed by the attraction between the cation and the oxygen ion, which is represented by the following formula (1).

$$A_i=Z_i\cdot Zo^{2-}/(r_i+ro^{2-})^2=2Z_i/(r_i+1.4)^2 \quad (1)$$

$A_i$: cation—oxygen ion attraction, $Z_i$: valence of i component cation, $r_i$: radius of i component cation (Å)

The oxygen donation ability of the single component oxide $M_iO$ is provided by the reciprocal of $A_i$, and thus satisfies the following formula (2).

$$B_i^{0}=1/A_i \quad (2)$$

Now, in order to deal with the oxygen donation ability ideologically and quantitatively, the obtained Bi0 value is turned into an indicator.

The $B_i^0$ value obtained above from the formula (2) is substituted into the following formula (3) to recalculate the basicity, thereby making it possible to deal with the basicity quantitatively for all of the oxides.

$$B_i=(B_i^0-B_{SiO2}^0)/(B_{CaO}^0-B_{SiO2}^0) \quad (3)$$

It is to be noted that when $B_i^0$ value is turned into an indicator, the $B_i$ value of CaO and the $B_i$ value of $SiO_2$ are respectively defined as 1.000 ($B_i^0$=1.43) and 0.000 ($B_i^0$=0.41).

The respective inorganic oxides M1 to M10 shown in Table 1 and the organic vehicle OV1 of composition as shown in Table 3 were blended at ratios as shown in Table 4, and kneaded and dispersed with the use of a three roll mill or the like to prepare sealing layer pastes P1 to P10 as shown in Table 4.

TABLE 4

| Sample | Constituent of Sealing Layer (volume %) | | | | | | | | | | Organic Vehicle |
|---|---|---|---|---|---|---|---|---|---|---|---|
| Number | M1 | M2 | M3 | M4 | M5 | M6 | M7 | M8 | M9 | M10 | OV1 |
| P1 | 18.8 | — | — | — | — | — | — | — | — | — | 81.2 |
| P2 | — | 18.8 | — | — | — | — | — | — | — | — | 81.2 |
| P3 | — | — | 18.8 | — | — | — | — | — | — | — | 81.2 |
| P4 | — | — | — | 18.8 | — | — | — | — | — | — | 81.2 |
| P5 | — | — | — | — | 18.8 | — | — | — | — | — | 81.2 |
| P6 | — | — | — | — | — | 18.8 | — | — | — | — | 81.2 |
| P7 | — | — | — | — | — | — | 18.8 | — | — | — | 81.2 |
| P8 | — | — | — | — | — | — | — | 18.8 | — | — | 81.2 |
| P9 | — | — | — | — | — | — | — | — | 18.8 | — | 81.2 |
| P10 | — | — | — | — | — | — | — | — | — | 18.8 | 81.2 |

As a paste for forming the cavity section 12 described above, a resin paste decomposed and burned to disappear in a firing step was prepared, such as a resin, an organic solvent, and an organic binder.

Figure 5:
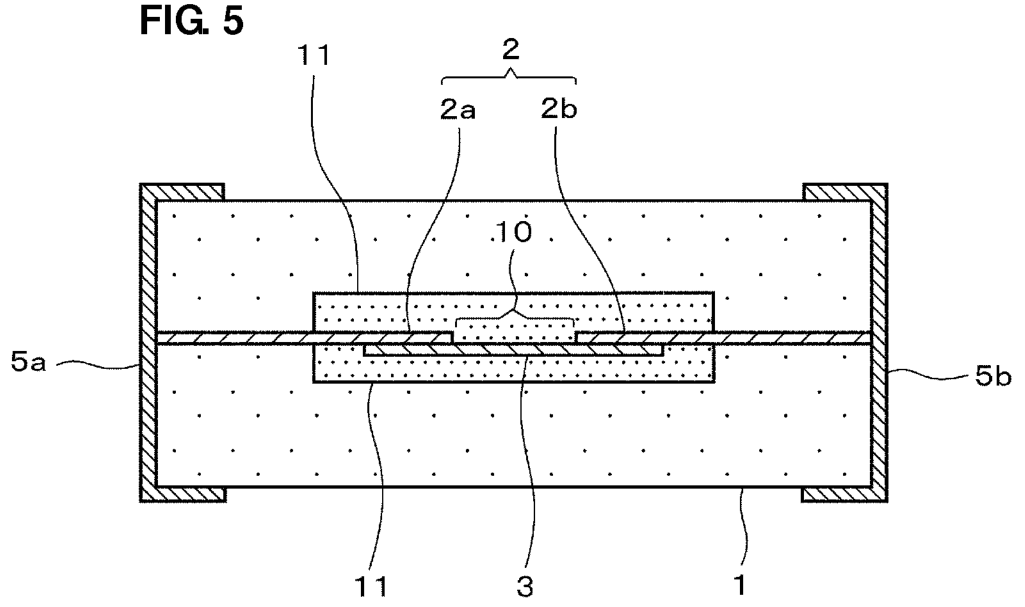
FIG. 5 is a front cross-sectional view schematically illustrating the structure of an ESD protection device including no cavity section, according to a preferred embodiment of the present invention.

In this example, prepared were an ESD protection device with a structure including the cavity section 12 as shown in FIGS. 1 to 3, and an ESD protection device including no cavity section as shown in FIG. 5.

It is to be noted that FIGS. 1 to 3 and FIG. 5 show fired ESD protection devices, while each section is unfired in the steps of applying the respective pastes for manufacturing the ESD protection devices. However, for the sake of easy understanding, with reference to FIGS. 1 to 3 and FIG. 5 including the respective sections formed by firing the respective pastes applied, the reference numerals provided in the respective drawings will be used to give an explanation.

First, the sealing layer paste is applied onto a first ceramic green sheet to form an unfired sealing layer 11.

Then, the discharge auxiliary electrode paste is printed on the sealing layer 11 by a screen printing method so as to provide a predetermined pattern, thereby forming an unfired discharge auxiliary electrode 3.

Furthermore, the opposed electrode paste is applied to form an opposed electrode 2*a* on one side and an opposed electrode 2*b* on the other side, to define the opposed electrodes. Thus, the discharge gap 10 (see FIGS. 1 to 3) is provided between the ends of the opposed electrode 2*a* on one side and the opposed electrode 2*b* on the other side, which are opposed to each other.

It is to be noted that in this example, the width W (FIG. 3) of the opposed electrode 2*a* on one side and the opposed electrode 2*b* on the other side for constituting the opposed electrodes 2 and the dimension G (FIG. 3) of the discharge gap 10 were respectively adjusted to be about 100 μm and about 30 μm, for example, in the ESD protection device obtained through a firing step, etc.

Then, the resin paste for the formation of the cavity section is applied to a region in which the cavity section 12 is to be formed, over the opposed electrodes 2 and the discharge auxiliary electrode 3.

Further, the sealing layer paste is applied from above so as to cover the resin paste for the formation of the cavity section, thereby forming an unfired sealing layer 11.

It is to be noted that the respective pastes, including the sealing layer paste, may be applied directly onto an object to which the pastes are to be applied, or may be applied by other methods such as a transfer method.

In addition, the order of applying the respective pastes and the specific patterns of the pastes are not to be considered limited to the examples described above. However, it is always necessary to place the opposed electrodes and the discharge auxiliary electrode adjacent to each other. Furthermore, it is necessary to adopt a structure in which the sealing layer is placed between the ceramic constituting the ceramic base material and the electrode.

A second ceramic green sheet with no paste applied thereto is stacked on the first ceramic green sheet with the respective pastes applied thereto in the order of the sealing layer paste, the discharge auxiliary electrode paste, the opposed electrode paste, the resin paste, and the sealing layer paste in the way described above, and subjected to pressure bonding. In this case, a laminated body was formed so as to have a thickness of about 0.3 mm, for example.

The laminated body was cut into a predetermined size, and then subjected to firing under the condition of the maximum temperature of 980° C. to 1000° C. in a firing furnace with an atmosphere controlled by using $N_2/H_2/H_2O$. Then, an external electrode paste was applied onto both ends of the fired chip (sample), and further subjected to firing in a firing furnace with an atmosphere controlled, thereby providing an ESD protection device including the structure as shown in FIGS. 1 to 3.

Furthermore, an ESD protection device including no cavity section was prepared as shown in FIG. 5 by skipping the step of applying the resin paste for the formation of the cavity section in step (6) of printing the respective pastes, while carrying out the other steps as described above.

Further, in this example, for the purpose of characteristic evaluation, the sealing layer pastes P1 to P10 shown in Table 4 were used as the sealing layer paste to prepare ESD protection devices (samples of sample numbers 1 to 10 in Table 5) each including no cavity section and ESD protection devices (samples of sample numbers 12 to 21 in Table 5) each including a cavity section.

In addition, for comparison, prepared were an ESD protection device (a sample of sample number 11 in Table 5) including no cavity section and including no sealing layer and an ESD protection device (a sample of sample number 22 in Table 5) including a cavity section and including no sealing layer.

TABLE 5

| Sample | Sealing Layer Paste | | | | | | | | | |
|---|---|---|---|---|---|---|---|---|---|---|
| Number | P1 | P2 | P3 | P4 | P5 | P6 | P7 | P8 | P9 | P10 |
| 1 | ○ | — | — | — | — | — | — | — | — | — |
| 2 | — | ○ | — | — | — | — | — | — | — | — |
| 3 | — | — | ○ | — | — | — | — | — | — | — |
| 4 | — | — | — | ○ | — | — | — | — | — | — |
| 5 | — | — | — | — | ○ | — | — | — | — | — |
| 6 | — | — | — | — | — | ○ | — | — | — | — |
| 7 | — | — | — | — | — | — | ○ | — | — | — |
| 8 | — | — | — | — | — | — | — | ○ | — | — |
| 9 | — | — | — | — | — | — | — | — | ○ | — |
| 10 | — | — | — | — | — | — | — | — | — | ○ |
| *11 | — | — | — | — | — | — | — | — | — | — |
| 12 | ○ | — | — | — | — | — | — | — | — | — |
| 13 | — | ○ | — | — | — | — | — | — | — | — |
| 14 | — | — | ○ | — | — | — | — | — | — | — |
| 15 | — | — | — | ○ | — | — | — | — | — | — |
| 16 | — | — | — | — | ○ | — | — | — | — | — |
| 17 | — | — | — | — | — | ○ | — | — | — | — |
| 18 | — | — | — | — | — | — | ○ | — | — | — |
| 19 | — | — | — | — | — | — | — | ○ | — | — |
| 20 | — | — | — | — | — | — | — | — | ○ | — |
| 21 | — | — | — | — | — | — | — | — | — | ○ |
| *22 | — | — | — | — | — | — | — | — | — | — |

*mark: outside the scope of the present invention (without the sealing layer)

Next, the respective ESD protection devices (samples) prepared in the way described above were examined for their respective characteristics by the following methods.

The samples were cut along the thickness direction, the cut surfaces were subjected to polishing, and the interface between the sealing layer and the ceramic base material was then observed by SEM and WDX to check the thickness of a reactive layer formed at the interface.

Voltages were applied to the respective samples under two types of conditions of 8 kV×50 shots and 20 kV×10 shots, and the sample with log IR>6Ω was evaluated as a sample with good short circuit characteristics (○), whereas the sample with log IR>6Ω once during the continuous application of the voltages was evaluated as a sample with defective circuit characteristics (×).

In conformity with the IEC standard, IEC 61000-4-2, a peak voltage value: Vpeak and a voltage value after 30 ns from the crest value: Vclamp were measured in contact discharge at 8 kV. The voltage application was carried out 20 times for each sample.

The sample with Vpeak_max≦900 V was evaluated as a sample with good Vpeak (○), and the sample with Vclamp_max≦100 V was evaluated as a sample with good Vclamp (○).

Loads of short: 8 kV×100 shots and Vclamp: 8 kV×1000 shots were applied, and the sample with log IR>6 and Vclamp_max≦100 V for all of the measurement results was evaluated as a sample with good repetition characteristics (○).

The appearances of the fired products were observed visually, furthermore, the products with cross sections polished were observed under a microscope, and the sample with no crack caused was evaluated as a good sample (○). In addition, as for substrate warpage, the products were placed on a horizontal plate, and the sample with the center or ends not away from the plate was evaluated as a good sample (○).

Table 6 shows the results of evaluating the characteristics in the way described above.

TABLE 6

| Sample Number | ΔB | Thickness of Reactive Layer (μm) | Short Circuit Characteristics 8 kV | Short Circuit Characteristics 20 kV | V peak | V clamp | Repetition Characteristics | Substrate Fracture, Substrate Warpage | Comprehensive Evaluation |
|---|---|---|---|---|---|---|---|---|---|
| 1 | 1.33 | 43.6 | ○ | ○ | ○ | ○ | ○ | ○ | ○ |
| 2 | 0.89 | 5.1 | ○ | ○ | ○ | ○ | ○ | ○ | ○ |
| 3 | 0.08 | 1.9 | ○ | ○ | ○ | ○ | ○ | ○ | ○ |
| 4 | −0.09 | 1.6 | ○ | ○ | ○ | ○ | ○ | ○ | ○ |
| 5 | 0.02 | 4.2 | ○ | ○ | ○ | ○ | ○ | ○ | ○ |
| 6 | 0.07 | 2.0 | ○ | ○ | ○ | ○ | ○ | ○ | ○ |
| 7 | 0.15 | 1.6 | ○ | ○ | ○ | ○ | ○ | ○ | ○ |
| 8 | 0.53 | 5.1 | ○ | ○ | ○ | ○ | ○ | ○ | ○ |
| 9 | 0.61 | 6.0 | ○ | ○ | ○ | ○ | ○ | ○ | ○ |
| 10 | 1.05 | 30.8 | ○ | ○ | ○ | ○ | ○ | ○ | ○ |
| *11 | — | — | ○ | X | ○ | ○ | X | ○ | X |
| 12 | 1.33 | — | ○ | ○ | ○ | ○ | ○ | ○ | ○ |
| 13 | 0.89 | — | ○ | ○ | ○ | ○ | ○ | ○ | ○ |
| 14 | 0.08 | — | ○ | ○ | ○ | ○ | ○ | ○ | ○ |
| 15 | −0.09 | — | ○ | ○ | ○ | ○ | ○ | ○ | ○ |
| 16 | 0.02 | — | ○ | ○ | ○ | ○ | ○ | ○ | ○ |
| 17 | 0.07 | — | ○ | ○ | ○ | ○ | ○ | ○ | ○ |
| 18 | 0.15 | — | ○ | ○ | ○ | ○ | ○ | ○ | ○ |
| 19 | 0.53 | — | ○ | ○ | ○ | ○ | ○ | ○ | ○ |
| 20 | 0.61 | — | ○ | ○ | ○ | ○ | ○ | ○ | ○ |
| 21 | 1.05 | — | ○ | ○ | ○ | ○ | ○ | ○ | ○ |
| *22 | — | — | ○ | X | ○ | ○ | X | ○ | X |

*mark: outside the scope of the present invention (without the sealing layer)

Figure 6:
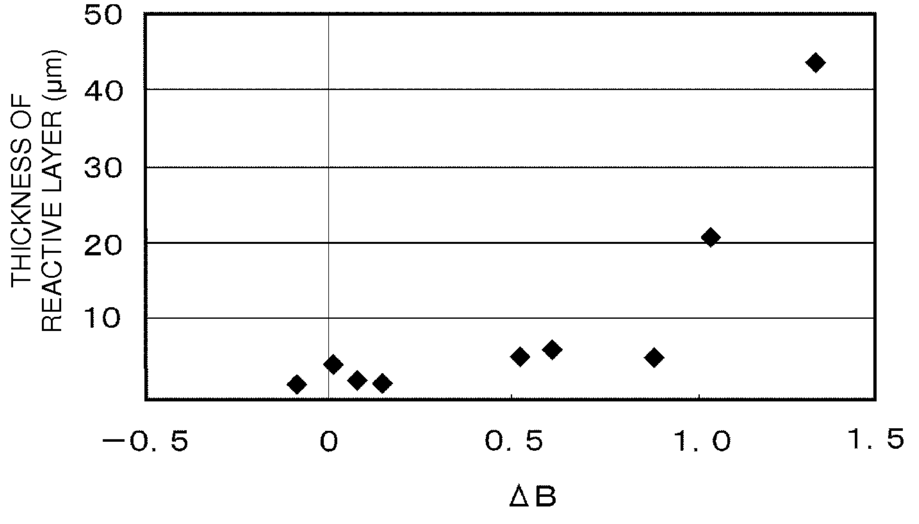
FIG. 6 is a graph showing the relationship between ΔB and the thickness of a reactive layer in the ESD protection device according to a preferred embodiment of the present invention.

First, as for the thickness of the reactive layer, as shown in Table 6, it has been confirmed that the respective samples of sample numbers 1 to 10 show a correlation between the ΔB value (see Table 1) and the thickness of the reactive layer, and there is a tendency that the thickness of the reactive layer is increased with increase in ΔB value (see FIG. 6).

Further, for the samples of sample numbers 1 to 10 (that is, the samples with ΔB of 1.4 or less), it has been confirmed that sufficient adhesion is ensured at the interface between the sealing layer and the ceramic constituting the ceramic base material, and the samples are usable even when the firing temperature is lower than the melting point of the material constituting the sealing layer.

The thickness of reactive layer has not been measured for the samples of sample numbers 12 to 21, on the grounds that it is clear that the samples of sample numbers 12 to 21 are samples prepared by using the same type of ceramic under the same firing condition as those for the samples of sample numbers 1 to 10, which also have the same thickness of the reactive layer as in the case of the samples of sample numbers 1 to 10.

In addition, the samples of sample numbers 11 and with no sealing layer provided have thus not been subjected to the measurement of reactive layer thickness.

As for short circuit characteristics, it has been confirmed that the respective samples of sample numbers 1 to 10 and 12 to 21 have no short circuit defect caused after applying each of the initial short and the continuous ESD, and have no problem with their short circuit characteristics.

On the other hand, it has been confirmed that in the case of the samples of sample numbers 11 and 22 with no sealing layer provided, the incidence of short circuit is increased as the inserted voltage value is increased, although no short circuit defect was caused in the evaluation at 8 kV, and although not shown in Table 6, in particular, the sample of sample number 11 with no cavity section provided has a higher incidence of short circuit than the sample of sample number 22. This is believed to be due to the larger inflow of the glass component from the ceramic, and thus progressive sintering of the discharge auxiliary electrode in the case of the sample of sample number 11 with the both upper and lower surfaces of the discharge auxiliary electrode in direct contact with the ceramic constituting the ceramic base material, than in the case of the sample of sample number 22 with only the lower surface of the discharge auxiliary electrode in contact with the ceramic. It is to be noted that the excessive sintering of the discharge auxiliary electrode brings the Cu powders close to each other, and thus makes it likely to that a short circuit defect is caused through fusion of the Cu powders to each other during the ESD application.

In addition, it has been confirmed that the sample of sample number 11 has a higher incidence of short circuit defect during the continuous ESD application than the sample of sample number 22.

Furthermore, the following discovery has been made with respect to Vpeak and Vclamp. More specifically, it has been discovered that each sample of sample numbers 1 to 22 achieves required characteristics for Vpeak and Vclamp, and a discharge phenomenon is thus produced in the protection element quickly during the ESD application. Further, although no numerical value is shown in Table 6, it has been confirmed that the values of Vpeak and Vclamp tend to be lower in the case of the samples of sample numbers 12 to 22 each with the cavity section present therein than in the case of the samples of sample numbers 1 to 11 with no cavity section present therein, and it has been confirmed that the discharge capacity is higher in the case of having the cavity section.

Furthermore, the following discovery has been made with respect to the repetition characteristics. More specifically, it has been confirmed in each sample of sample numbers 1 to 10 and 12 to 21 that the discharge capacity is kept favorable even when the frequency of voltage application is increased.

However, in the case of the samples of sample numbers 11 and 22 including no sealing layer, the occurrence of short circuit was observed during the continuous application as for the short circuit characteristics, while required characteristics were achieved for Vpeak and Vclamp. Further, although not shown in Table 6, it has been confirmed that the incidence of short circuit is lower in the case of the structure including the cavity section. This is believed to be because the structure including the cavity section makes it less likely that sintering of the discharge auxiliary electrode is developed.

In addition, as for substrate fracture and substrate warpage, as shown in Table 6, it has been confirmed that either substrate fracture or substrate warpage is not caused when ΔB (the difference ΔB between the basicity B1 of the main constituent constituting the sealing layer and the basicity B2 of the amorphous portion of the ceramic constituting the ceramic base material) is 1.33 or less, in each case of the sealing layer using the material containing some of the elements constituting the ceramic substrate, and the sealing layer using the other materials shown in Table 1. Further, it has been confirmed from behaviors of other samples, not shown in Table 6, regarding substrate fracture and substrate warpage, etc. that favorable sealing layers can be formed without problems such as structural disorder as long as ΔB is about 1.4 or less, for example.

As for the presence or absence of the cavity section, as briefly described above, it has been confirmed that, although not shown in Table 6, the characteristics for Vpeak and Vclamp are better in the case of samples of sample numbers 12 to 22 including the cavity section, as compared with the samples of sample numbers 1 to 11 including no cavity section. This is presumed to be because the cavity section provided induces discharge in the air, besides the discharge auxiliary electrode section, to increase the number of electrons emitted to the outside.

In addition, in the case of the ESD protection devices in Japanese Patent Application Laid-Open No. 9-266053 and Japanese Patent Application Laid-Open No. 2001-43954 described above, an inert gas or the like is encapsulated in the cavity section to manufacture products, and it is thus necessary to use equipment capable of stacking under the atmosphere of the gas to be encapsulated. However, in the case of the ESD protection device according to a preferred embodiment of the present invention, the resin paste is printed, and decomposed and burned (to disappear) during the firing to form the cavity section, and the equipment cost can be thus reduced without the need for special equipment.

In addition, preferred embodiments of the present invention can form the cavity section by a printing method, and thus diminish the effect of stacking displacement during stacking, as compared with the prior art in Japanese Patent Application Laid-Open No. 9-266053 and Japanese Patent Application Laid-Open No. 2001-43954.

Furthermore, although no inert gas is encapsulated in the cavity section of preferred embodiments of the present invention, any short circuit or effect on discharge voltage characteristics (V characteristics) was not recognized at all when the samples prepared by the method according to a preferred embodiment of the present invention were stored under a low-temperature atmosphere (−55° C./1000 h) or a high-temperature atmosphere (125° C./1000 h), or subjected to a load in moisture (85° C./85% RH/15 V/1000 h) or a thermal shock (−55° C.⇔ 125° C./400 cycle), and it has been confirmed that the production in accordance with the general-purpose method is possible without the need to encapsulate any inert gas into the cavity section.

The preferred embodiments described above have confirmed that according to the present invention, the inflow of the glass component from the ceramic base material containing glass into the discharge auxiliary electrode or the discharge gap section can be suppressed and prevented by the sealing layer to efficiently manufacture an ESD protection device which is excellent in discharge capacity with high reliability.

Figure 7:
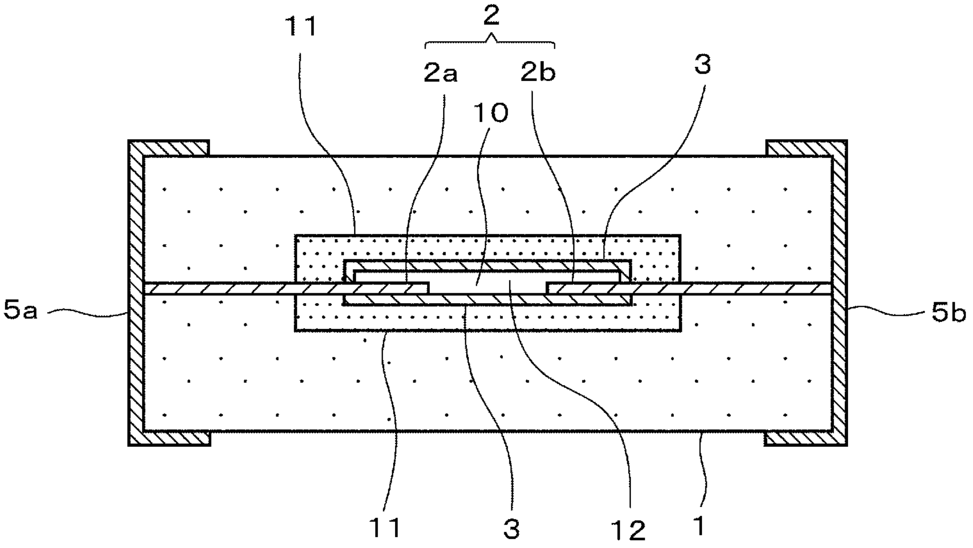
FIG. 7 is a front cross-sectional view illustrating another example of the ESD protection device according to a preferred embodiment of the present invention.
Figure 8:
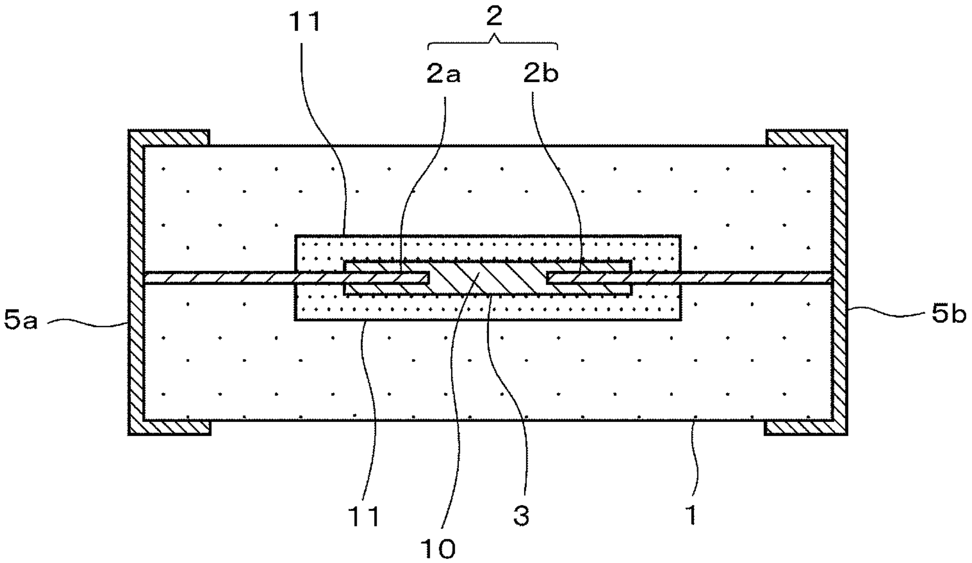
FIG. 8 is a front cross-sectional view illustrating yet another example of the ESD protection device according to a preferred embodiment of the present invention.
Figure 9:
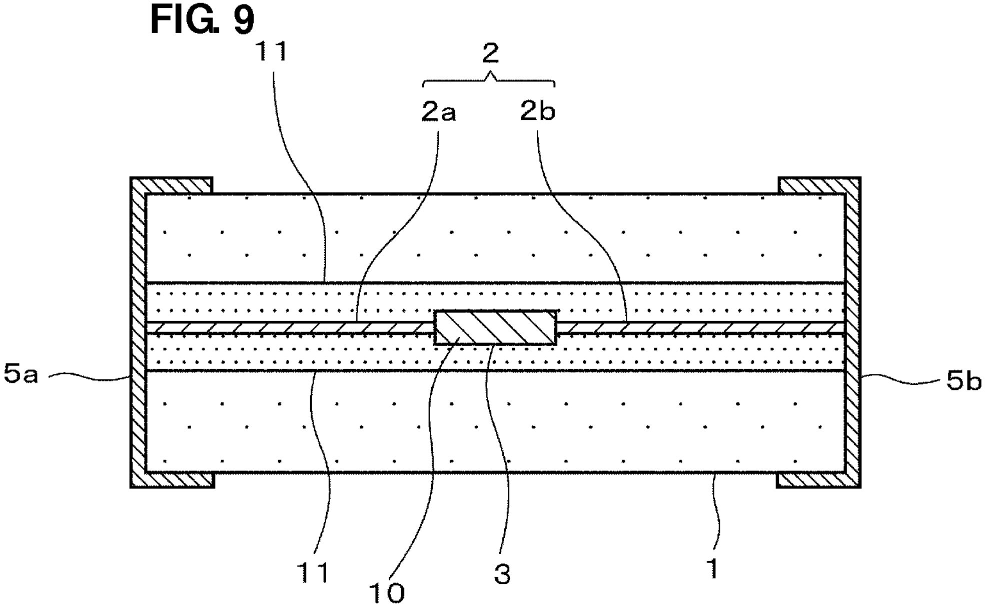
FIG. 9 is a front cross-sectional view illustrating yet another example of the ESD protection device according to a preferred embodiment of the present invention.
Figure 10:
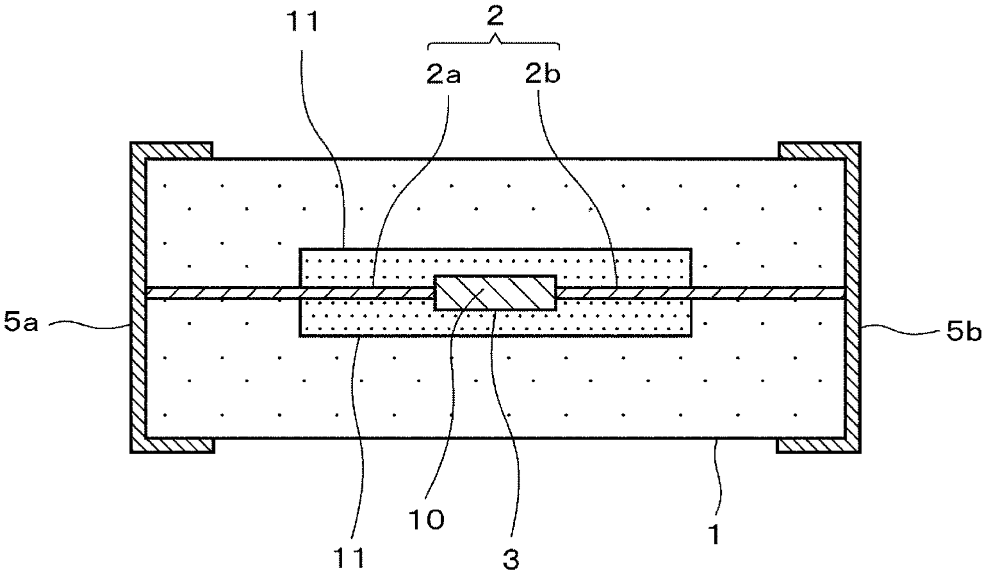
FIG. 10 is a front cross-sectional view illustrating yet another example of the ESD protection device according to a preferred embodiment of the present invention.

While the examples of the ESD protection device which has the structure including the cavity section as shown in FIGS. 1 to 4 and of the ESD protection device which has the structure including no cavity section as shown in FIG. 5 have been described in the preferred embodiments described above, examples of ESD protection devices to which preferred embodiments of the present invention are applied include, additionally, (1) an ESD protection device which has a structure including a cavity section 12, a discharge auxiliary electrode 3 arranged so as to surround the cavity section 12, and a sealing layer 11 arranged so as to surround the discharge auxiliary electrode 3, as shown in FIG. 7, (2) an ESD protection device which has a structure including no cavity section, in which an opposed electrode 2*a* on one side and an opposed electrode 2*b* on the other side for constituting opposed electrodes 2 have ends buried in the discharge auxiliary electrode 3, and a sealing layer 11 is arranged so as to surround the discharge auxiliary electrode 3, as shown in FIG. 8, (3) an ESD protection device which has a structure including no cavity section, in which the entire opposed electrodes 2 and the entire discharge auxiliary electrode 3 are sandwiched by sealing layers 11 from both principal surfaces, as shown in FIG. 9, and (4) an ESD protection device which has a structure including no cavity section, in which connections of opposed electrodes 2 with a discharge auxiliary electrode 3 and the space (a discharge gap 10) between the connections are sandwiched by sealing layers 11 from both principal surfaces to be isolated from the ceramic constituting the ceramic base material 1, as shown in FIG. 10.

However, it is also possible to use still other structures other than the structures shown in FIGS. 7 to 10 for the specific shapes and arrangement of the sealing layer and cavity section and the specific structures of the opposed electrodes and discharge auxiliary electrode.

In addition, the ESD protection device according to preferred embodiments of the present invention has a correlation between the thickness of reactive layer and the difference (ΔB value) between the basicity B1 of the main constituent material of the sealing layer and the basicity B2 of the amorphous portion constituting the ceramic base material. Thus, the use of a material with a predetermined ΔB value for the constituent material of the sealing layer allows the achievement of a sealing layer paste which is able to form a reactive layer with a desired thickness, and the use of the sealing layer paste can efficiently manufacture an ESD protection device which has desirable characteristics.

It should be noted that the present invention is not to be considered limited to the preferred embodiments described herein, and it is possible to find various applications of and make various modifications to the type of and method of formation of the material constituting the sealing layer, the method of formation of the cavity section, the constituent materials and specific shapes of the opposed electrodes and discharge auxiliary electrode, the composition of the glass-containing ceramic constituting the ceramic base material, etc., within the scope of the present invention.

As described above, preferred embodiments of the present invention provide ESD protection devices which have stable characteristics, which will not be degraded even when the static electricity is applied repeatedly. Therefore, it is possible to apply preferred embodiments of the present invention widely in the field of ESD protection devices for the protection of various appliances and devices including semiconductor devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ESD protection device comprising:

a ceramic base material including a glass component;

opposed electrodes including an opposed electrode on a first side and an opposed electrode on a second side, the opposed electrodes including portions opposed to each other with a distance therebetween in the ceramic base material; and a discharge auxiliary electrode connected to each of the opposed electrode on the first side and the opposed electrode on the second side, the discharge auxiliary electrode being arranged to provide a bridge from the opposed electrode on the first side to the opposed electrode on the second side; wherein a sealing layer to prevent ingress of the glass component from the ceramic base material into the discharge auxiliary electrode is provided between the discharge auxiliary electrode and the ceramic base material.

2. The ESD protection device according to claim 1, wherein a reactive layer including a reaction product formed by a reaction between a constituent material of the sealing layer and a constituent material of the ceramic base material is provided at an interface between the sealing layer and the ceramic base material.

3. The ESD protection device according to claim 1, wherein the difference ΔB (=B1−B2) is about 1.4 or less between basicity B1 of a main constituent material of the sealing layer and basicity B2 of an amorphous portion constituting the ceramic base material.

4. The ESD protection device according to claim 1, wherein the sealing layer contains some of elements constituting the ceramic base material.

5. The ESD protection device according to claim 1, wherein the sealing layer contains an aluminum oxide as its main constituent.

6. The ESD protection device according to claim 1, wherein a cavity section is provided in the ceramic base material, to cause the cavity section to face a discharge gap section where the opposed electrode on the first side and the opposed electrode on the second side have portions facing each other, and a region of the discharge auxiliary electrode located on the discharge gap section.

7. The ESD protection device according to claim 1, wherein the discharge auxiliary electrode includes a metallic particle and a ceramic component.

8. A method for manufacturing an ESD protection device, the method comprising the steps of:

printing a sealing layer paste on one principal surface of a first ceramic green sheet, thereby forming an unfired sealing layer;

printing a discharge auxiliary electrode paste to coat at least a portion of the sealing layer, thereby forming an unfired discharge auxiliary electrode;

printing an opposed electrode paste on one principal surface of the first ceramic green sheet, thereby forming unfired opposed electrodes including an opposed electrode on a first side and an opposed electrode on a second side, the opposed electrodes each partially covering the discharge auxiliary electrode, and the opposed electrodes being formed with a distance therebetween;

printing a sealing layer paste so as to cover a discharge gap section where the opposed electrode on the first side and the opposed electrode on the second side have portions facing each other, and a region of the discharge auxiliary electrode located on the discharge gap section, thereby forming an unfired sealing layer;

stacking a second ceramic green sheet on one principal surface of the first ceramic green sheet, thereby forming an unfired laminated body; and firing the laminated body.

* * * * *